May 23, 1939.  J. D. BERGER  2,159,311
WALNUT TREE SHAKER
Filed May 22, 1937  2 Sheets-Sheet 1
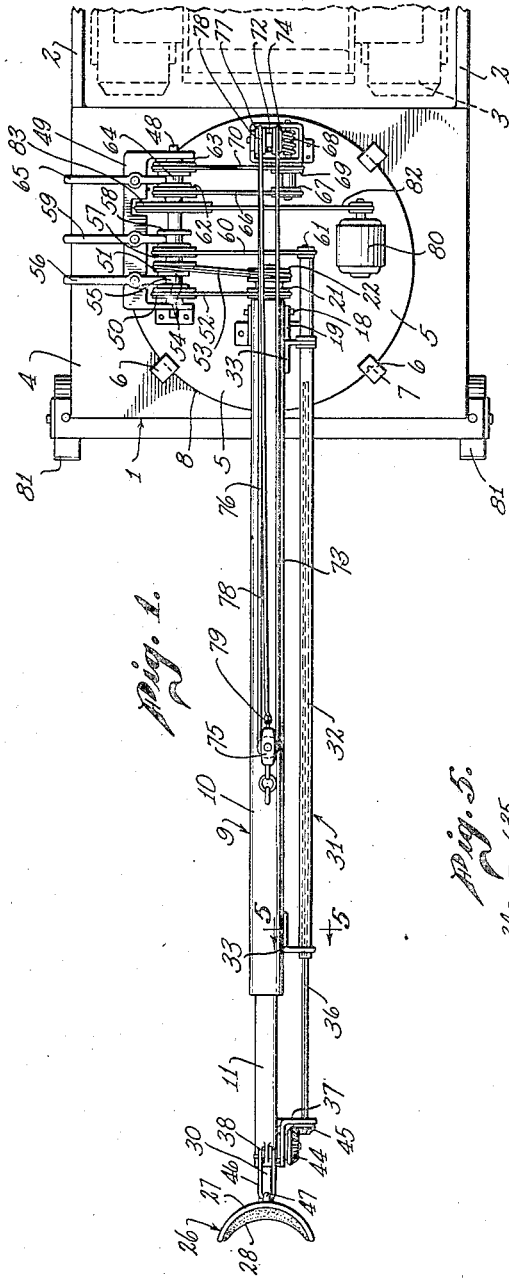
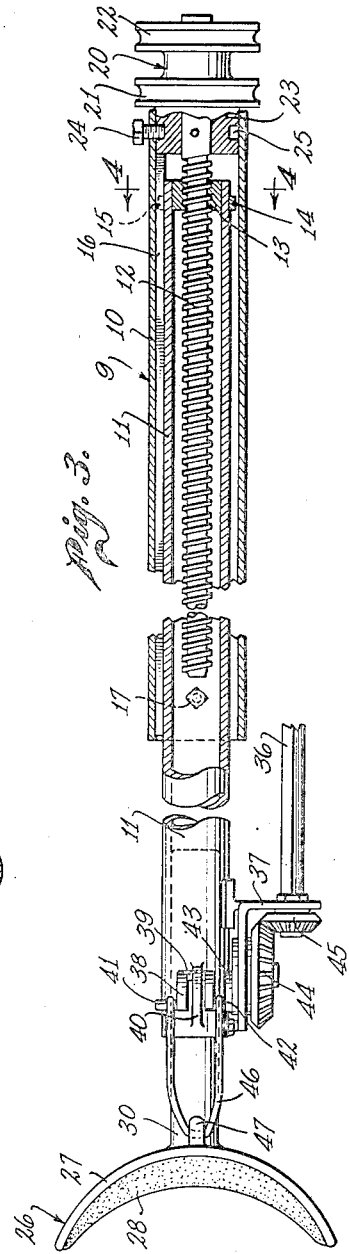
Inventor
Joseph D. Berger
By Lyon & Lyon
Attorneys May 23, 1939.   J. D. BERGER   2,159,311
WALNUT TREE SHAKER
Filed May 22, 1937   2 Sheets-Sheet 2
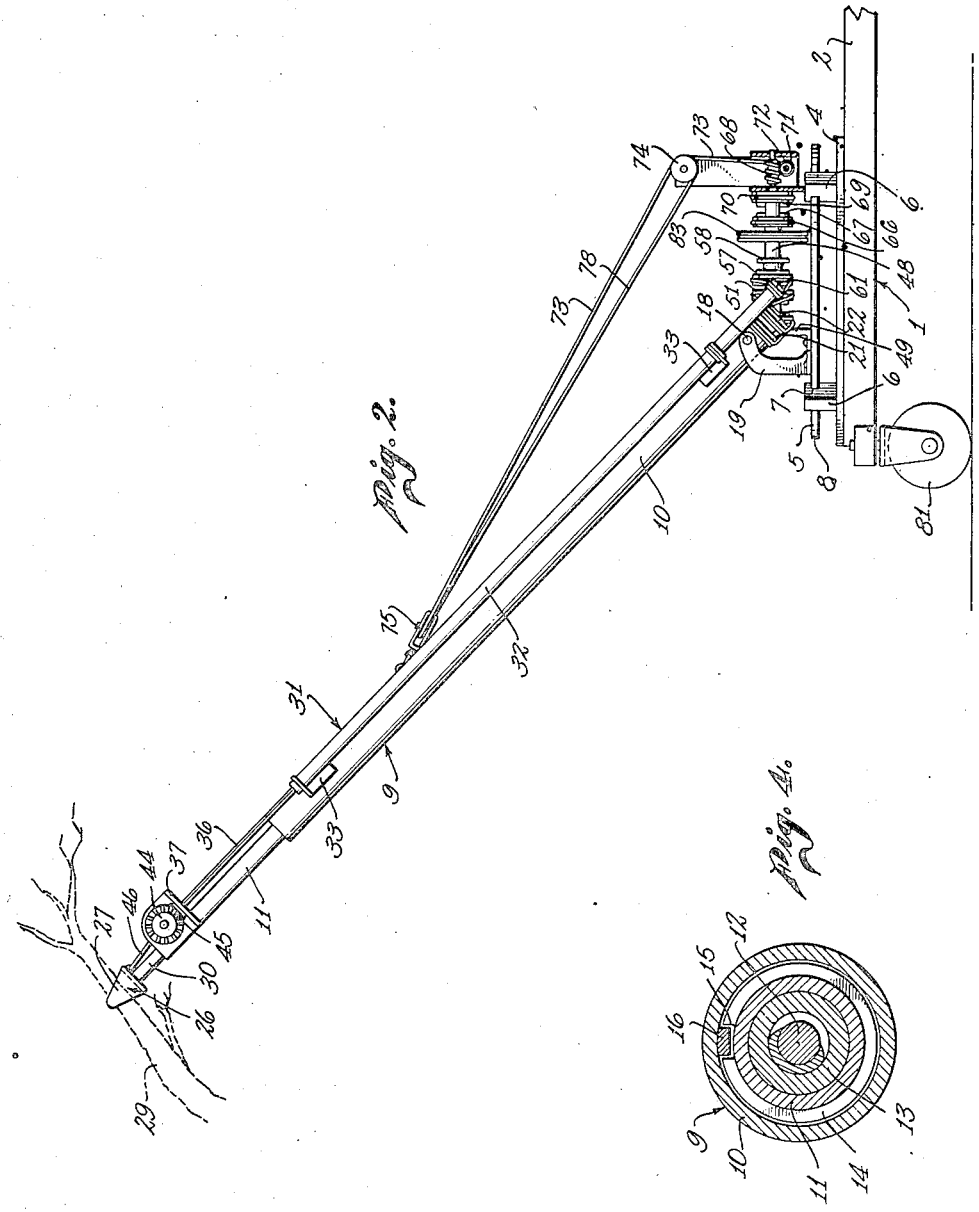
Inventor
Joseph D. Berger
By Lyon & Lyon
Attorneys Patented May 23, 1939

2,159,311

UNITED STATES PATENT OFFICE 2,159,311

WALNUT TREE SHAKER

Joseph D. Berger, Covina, Calif.

Application May 22, 1937, Serial No. 144,185

10 Claims. (Cl. 56—328)

This invention relates to a machine for shaking the limbs of trees. The invention is particularly useful in shaking the limbs of walnut trees. When walnuts develop to a condition such that they are ready to be picked, it is necessary that they be picked without delay. This may cause a considerable shortage of labor for this purpose.

The object of this invention is to provide a machine of simple construction, that can be moved around through an orchard, and having means for enabling the limbs of the trees to be shaken, thereby accomplishing a considerable saving in the cost of labor. Before shaking the limbs of the tree, of course, canvas or duck sheets are placed on the ground so as to catch the nuts that are shaken from the tree. These sheets can then be picked up and the nuts poured into baskets or other containers to be taken to the packing house for sorting and packing.

One of the objects of the invention is to provide a mechanism of this kind, involving the use of an extensible boom that can be raised to any angle desired, and extended to enable it to engage the limb to be shaken; also, to provide a machine of this kind with simple means for extending the boom and for reciprocating means such as a saddle that engages the limb that is to be shaken.

In the preferred construction of the machine, the boom is mounted at its base to rotate on a horizontal axis, and the lower end of the boom is provided with rotatable means for extending the boom and for withdrawing the extensible part of the boom at will; and one of the objects of the invention is to provide simple means for effecting these movements.

In its preferred construction, the boom involves the use of an extension member that may be projected at will upwardly beyond the upper end of the body of the boom, and this extension member carries means such as a hook or saddle for engaging the limb to be shaken; and one of the objects of the invention is to provide simple means for maintaining connection with this saddle in any extended position of the extension member.

A further object of the invention is to provide a machine of this kind having an improved general construction for enabling it to perform its functions.

Further objects of the invention will appear hereinafter.

The invention consists in the novel parts and combination of parts to be described hereinafter, all of which contribute to produce an efficient walnut tree shaker.

A preferred embodiment of the invention is described in the following specification, while the broad scope of the invention is pointed out in the appended claims.

In the drawings:

Fig. 1 is a plan of the machine with the boom let down to a substantially horizontal position, and indicating in dotted lines the forward end of a tractor to which the portable frame of the machine is preferably attached.

Fig. 2 is a side elevation of the machine with the boom elevated, and indicating a limb in dotted lines, against which the boom is set for shaking the limb. In this view the rear portion of the portable frame is broken away.

Fig. 3 is a partial elevation and longitudinal section through the boom, certain parts being broken away. This view particularly illustrates the means for effecting the extension of the extensible member of the boom, and for driving the shaker or saddle that engages the limb. This view is upon an enlarged scale.

Fig. 4 is a cross-section on the line 4—4 of Fig. 3, and further illustrating details of the mechanism at the base of the boom. This view is upon an enlarged scale.

Fig. 5 is a cross section taken on the line 5—5 of Fig. 1, and further illustrating details of the extensible shaft that is provided for reciprocating the shaker in any extended position of the boom. This view is upon an enlarged scale.

In practicing the invention, I provide a boom which is mounted upon a portable frame 1, and this frame is preferably provided with rearwardly extending side bars 2 that should be secured to the sides of a tractor 3, indicated in dotted lines in Fig. 1. The advantage of using a tractor is that in spite of the weight of the boom when it is disposed at a low angle, the relatively great weight of the tractor will hold the frame 1 in its normal horizontal position. In other words, the tractor prevents the boom from tipping over the portable frame 1. The portable frame preferably comprises a horizontal platform 4 on which I mount a turntable 5 to rotate on a vertical axis at the center of the turntable. If desired, the turntable may be guided by means of a plurality of blocks or cleats 6, which have guide notches 7 cut in their inner faces to receive the projecting edge 8 of the table.

The boom 9 comprises a body 10, which is preferably of tubular form, and an extension member 11, which is also preferably of tubular form and which telescopes within the body member 10, being guided to slide in and out within the same. Within the body 10 I provide means for extending the extension member 11 and for withdrawing it back into the body 10. For this purpose I prefer to employ a feed screw 12 (see Fig. 3), which is of sufficiently small diameter to enable the extension member 11 to telescope over it. The inner end of the extension member 11 carries a rigid nut 13 running on the threads of the feed screw 12 so that when the feed screw is rotated the extension member 11 will travel in or out within the body 10. Suitable means is provided for preventing the rotation of the member 11 when the screw 12 is being rotated. For this purpose I prefer to provide the inner end of the extension member 11 with a guide ring 14, which guide ring is provided with a notch 15, which notch receives a longitudinal tongue 16 that may be welded or otherwise secured to the inner face of the body member 10 (see Fig. 4). At the limit of the outward movement of the inner tube or extension member 11, a set screw 17 is provided to engage the collar 14, to operate as a stop to prevent the extension member from being accidentally driven too far, and out of the upper end of the body member 10.

At the base of the body member 10, it is mounted on two side pins 18 in a yoke-shaped bracket 19, which is carried on the upper face of the turntable (see Figs. 1 and 2). These pins or pintles 18 are located a short distance above the extreme lower end of the body member 10.

Any suitable means may be provided for rotating the feed screw 12, but for this purpose I prefer to provide a double pulley 20 comprising two rigidly connected pulleys 21 and 22 rigidly carrying a hub 23, which is mounted to rotate in the lower end of the tubular body 10, and held in position by any suitable means; for example, by a set screw 24 running in a circumferential groove 25 (see Fig. 3).

On the outer end of the extension member 11, I mount a limb shaker 26 preferably comprising an inverted saddle 27 lined with a suitable pad 28 to preventing injuring the limb 29; and this limb shaker 26 also preferably includes a stem 30 that slides freely in the outer end of the tubular extension member 11. Suitable means is provided for reciprocating this shaker 26 in any extended position of the boom, and regardless of the angle at which the boom may be disposed. For this purpose I prefer to provide an extensible shaft 31 secured at the side of the boom, and preferably including a tubular lower section 32 mounted to rotate freely in bearing brackets 33 secured to the side of the body member 10. The upper end of this tubular shaft 32 is provided with a rigid collar 34 secured within the same, said collar having an angular or square opening 35 through the same, through which passes an angular extension shaft 36, the upper end of which is rotatably mounted in a bracket 37 secured to the side of the extension member 11. The upper end of the extension shaft 36 drives a crank 38 having a stub shaft 39 rotatably mounted in a bracket or fin 40 extending outwardly from the side of the extension member 11. This crank includes two crank pins 41 and 42, the latter of which is formed as a part of a crank arm 43 rigidly secured to the hub of a bevel gear 44, which bevel gear is driven by a bevel pinion 45. The crank pins 41 and 42 are attached to the forks of a yoke 46, the upper end of which is pivotally attached at 47 to the under face of the saddle 27. With this construction it will be evident that when the shaft 36 rotates, the crank 38 will be driven and the crank pins 41 will reciprocate the limb shaker 26. This will shake the nuts off of the limb.

Power-operated means is provided for driving the feed screw 12 and the shaker shaft 36. This means is mounted on the turntable 5, and preferably includes a horizontal countershaft 48 that is mounted to rotate freely in a clutch frame 49 secured to the upper side of the turntable. On this shaft 48 two loose driving pulleys 50 and 51 are provided, corresponding to the pulleys 21 and 22 respectively. The pulley 50 is connected by an open round belt 52 with the pulley 21, while the other pulley 51 is connected by a crossed belt 53 with the pulley 22. Each pulley 50 and 51 has a clutch member 54 corresponding to it, and between the two clutches 54 a splined clutch member 55 is mounted for operation by a lever 56, so that when the lever 56 is thrown in one direction from the neutral position shown in Fig. 1, one of these clutches will be closed, and when it is thrown in the other direction, the other clutch will be closed. By reason of the twisted belt 53, it will be evident that the belt 52 will drive the feed screw 12 in one direction, while the belt 53 can reverse the direction of the belt. Hence this belt drive affords means for extending the extension member 11, and for returning the same. Although I prefer to employ belts for effecting this driving connection, it will be evident that any suitable flexible connection may be employed for this purpose.

In order to rotate the body member 32 of the shaker shaft, I provide a countershaft 48 with a loose pulley 57 having a clutch member on its side to cooperate with a sliding clutch collar 58 splined to the countershaft and capable of being operated by a lever 59, and when this lever 59 is moved in a direction to close the clutch of the pulley 57, this pulley through a belt 60 can drive a belt pulley 61 on the lower end of the shaft 32. As the rotation of this shaft may require considerable power, if desired, the driving belt 60 with its corresponding driving pulleys can be duplicated so as to increase the amount of power that can be delivered to this shaft.

In order to raise and lower the boom on the horizontal axis of the pintles 18, the countershaft 48 is provided with two pulleys 62 and 63 cooperating with a double clutch member 64 controlled by a clutch lever 65. The pulley 62 drives an open belt 66 for driving a pulley 67 on an extension shaft from a worm 68, and a second pulley 69 is provided driven by a crossed belt 70 from the pulley 63. This enables the worm 68 to be driven in either direction at will, and this worm drives a worm wheel 71 (see Fig. 2), the shaft of which carries a drum 72 to which the end of a line 73 is attached. This line extends up over a guide pulley 74 and up through a pulley block 75 attached at an elevated point on the upper side of the boom (see Fig. 1). From the pulley block the line extends back in a run 76 around a second pulley 77, and thence forwardly in an anchored run 78, the upper end of which is attached at 79 to the block. In other words, the line 73 is disposed in several runs so as to reduce the speed at which the boom can be raised or lowered, and increasing the power arm so that the raising of the boom does not require greater power than can be furnished by a motor 80, which may be an electric motor or a gas engine, if desired.

The forward end of the portable frame 1 is preferably mounted on wheels 81 (see Fig. 1).

The motor 80, through a belt 82, drives the countershaft 48 through the medium of a pulley 83 on the countershaft.

The general mode of operation of the machine will now be described. The tractor 3 pushes the portable frame 1 through the orchard and stops opposite the trees that are to be shaken. The boom 9 is then lowered or elevated to bring it into position to operate upon the limb 29 that is to be shaken. This is accomplished by means of the clutch lever 65, which drives either the belt 66 or the belt 70 to rotate the worm 68 in the proper direction to lower the boom, or raise it. The turntable would be swung around by hand-power to bring the boom substantially into the plane of the limb. Then the clutch 56 would be thrown in the proper direction to rotate the feed screw 12 so as to push out the extension member 11 of the boom 9 sufficiently to enable the pad 28 to engage the outer or under side of the limb 29. After contact is had with the limb, then the clutch lever 59 is operated so as to close the clutch of the pulley 57, which will drive the shaker shaft 31. This will operate through the bevel gears 45 and 44 to drive the crank 38, thereby reciprocating the stem 30 of the shaker which will, of course, shake the limb. The lever 56 is operated in a reverse manner so as to reverse the rotation of the feed screw 12 and telescope the extension member 10 back into the body 10 of the boom.

It is obvious that the reciprocating stem 30 could be constructed to support a saw to enable this machine to be employed for sawing off limbs in trimming trees.

It is understood that the embodiment of the invention described herein is only one of the many embodiments this invention may take, and I do not wish to be limited in the practice of the invention, nor in the claims, to the particular embodiment set forth.

What I claim is:

1. In a machine for shaking the limbs of trees, the combination of a boom, means for supporting the same for rotation on a substantially vertical axis adjacent its lower end, said boom having an extensible section at its upper end having means for engaging the limb of the trees, means for raising and lowering the boom, means for imparting movement to the said extension to advance and withdraw the same, and means for reciprocating the limb engaging means.

2. In a machine for shaking the limbs of trees, the combination of a wheeled frame adapted to be moved through an orchard, a turntable mounted on the frame, a boom mounted on the turntable to swing in a substantially vertical plane, means for raising and lowering the boom, said boom having a body portion and an extension guided to project upwardly from the boom body, means for imparting movement to the said extension to extend and withdraw the same, means carried by the extension for engaging the limb to be shaken, and means for reciprocating the limb engaging means.

3. In a machine for shaking the limbs of trees, the combination of a frame, a portable frame, a turntable mounted on the portable frame to rotate on a substantially vertical axis, a boom having a tubular body mounted on the turntable to swing on a substantially horizontal axis, means connected with the boom at an elevated point for swinging the same up and down in a substantially vertical plane, an extension for the boom guided in and out of the upper end of its tubular body, means within the tubular body for projecting the said extension outwardly and for withdrawing the same, rotatable means at the lower end of the boom body for actuating the last-named means, a flexible driving connection connected to the rotatable means, means mounted on the turntable for driving the flexible connection to project the extension and withdraw the same at will, said extension having limb engaging means; and means mounted alongside of the tubular body and actuated from a point adjacent the turntable for reciprocating the limb engaging means.

4. In a machine for shaking the limbs of trees, the combination of a portable frame, a turntable mounted to rotate on the frame on a substantially vertical axis, a boom having a body with means for pivotally supporting the same on the turntable to swing in a substantially vertical plane, a feed screw rotatably mounted in the tubular body, an extension member for said boom body having means connecting the same with the feed screw to enable the extension to be extended from the boom body or withdrawn into the same, means mounted on the turntable for raising or lowering the boom, means supported on the turntable for rotating the feed screw in either direction, an extensible shaft with means for driving the same at the turntable, with its outer end connected with the extension member, and means carried by the extension member and actuated by the extensible shaft for shaking the limb.

5. In a machine for shaking the limbs of trees, the combination of a portable frame, a turntable mounted on the frame for rotation on a substantially vertical axis, a boom having a tubular body mounted on the turntable to swing up and down on a substantially horizontal axis, a feed screw extending longitudinally in the tubular body, a tubular extension member telescoping with the said body and having a nut for engaging the feed screw, a countershaft mounted on the turntable with its axis in a plane substantially parallel with the plane in which the boom swings up and down, flexible driving means between the countershaft and the lower end of the feed screw for rotating the feed screw in either direction, means carried by the extension member for engaging the limb of the tree, and means for driving same in any extended position of the extension member.

6. In a machine for shaking the limbs of trees, the combination of a portable frame, a turntable mounted on the frame for rotation on a substantially vertical axis, a boom having a tubular body with means for pivotally supporting the same adjacent its lower end on the turntable to swing in a substantially vertical plane, a feed screw mounted within the tubular body, a tubular extension member capable of telescoping within the tubular body and having means for engaging the feed screw to enable the extension member to be projected out from the body member and to be withdrawn within the same, a limb shaker carried by the extension member, an extensible shaft supported on the side of the body member and the extension member, means connecting the same with the shaker to shake the limb, and means mounted on the turntable for driving the feed screw in either direction for raising or lowering the boom and for rotating the extension shaft.

7. In a machine for shaking the limbs of trees, the combination of a portable frame, a turntable mounted on the same for rotation on a substantially vertical axis, a boom mounted on the turntable to swing in a substantially vertical plane, an extension member guided in and out of the upper end of the body of the boom, rotatable means within the boom body for advancing the extension member and for withdrawing the same at will, a countershaft mounted on the turntable in a plane substantially parallel to the plane in which the boom swings up and down, a movable saddle carried by the upper end of the extension member to engage the limb to be shaken, means extending along the side of the boom for actuating the same, a motor carried on the turntable for actuating the countershaft, and means actuated by the countershaft for raising or lowering the boom, for actuating the said extension shaft, and for reciprocating the saddle.

8. In a machine of the kind described, the combination of a boom, means for supporting the same for rotation on a substantially vertical axis adjacent its lower end, said boom having an extensible section at its upper end, means for raising and lowering the boom, means for imparting movement to the said extension to advance and withdraw the same, a stem guided to reciprocate at the upper end of the said extension, and means for reciprocating the said stem.

9. In a machine for shaking the limbs of trees, the combination of a boom, means for supporting the same for rotation on a substantially vertical axis adjacent its lower end, said boom having an extensible section at its upper end having means for engaging the limb of the tree, power-driven means for raising and lowering the boom, power-driven means for imparting movement to the said extension to advance and withdraw the same, and means for reciprocating the limb-engaging means.

10. In a machine for shaking the limbs of trees, the combination of a wheeled frame adapted to be moved through an orchard, a turntable mounted on the frame, a boom mounted on the turntable to swing in a substantially vertical plane, power-driven means for raising and lowering the boom, said boom having a body portion and an extension guided to project upwardly from the boom body, power-driven means for imparting movement to the said extension to advance and withdraw the same, means carried by the extension for engaging the limb to be shaken, and means for reciprocating the limb-engaging means.

JOSEPH D. BERGER.